United States Patent [19]

Linderman et al.

[11] 4,093,122
[45] June 6, 1978

[54] INTEGRATED DIVERGENT EXHAUST NOZZLE THRUST REVERSER

[75] Inventors: Duane L. Linderman, Chula Vista; Felix Hom, La Mesa, both of Calif.

[73] Assignee: Rohr Industries, Inc., Chula Vista, Calif.

[21] Appl. No.: 738,578

[22] Filed: Nov. 3, 1976

[51] Int. Cl.² ............... B64C 15/06; B64D 33/04
[52] U.S. Cl. ................ 239/127.3; 239/265.29; 239/265.37; 244/12.5; 244/23 D; 244/110 B
[58] Field of Search ........... 239/127.1, 127.3, 265.17, 239/265.19, 265.33, 265.37, 265.29; 244/12.5, 23 D, 110 B, 113; 60/230, 267, 232, 271, 228

[56] References Cited

U.S. PATENT DOCUMENTS

| | | | |
|---|---|---|---|
| 2,651,172 | 9/1953 | Kennedy | 239/127.3 |
| 3,684,182 | 8/1972 | Maison | 239/265.19 |

*Primary Examiner*—Bruce H. Stoner, Jr.
*Assistant Examiner*—Andres Kashnikow
*Attorney, Agent, or Firm*—Patrick J. Schlesinger; Frank D. Gilliam

[57] ABSTRACT

A relatively simple variable area divergent exhaust nozzle and low drag afterbody integrated with a target-type thrust reverser and used in conjunction with a convergent nozzle for application to the propulsion system of a high performance jet powered aircraft. Two or more aerodynamically shaped afterbody surfaces may be pivoted with a common actuation system to form: first an efficient nozzle-afterbody suitable for subsonic operation; second, a divergent nozzle-afterbody for efficient supersonic operation and; third, a target-type thrust reverser for in-flight or ground roll deceleration.

15 Claims, 8 Drawing Figures

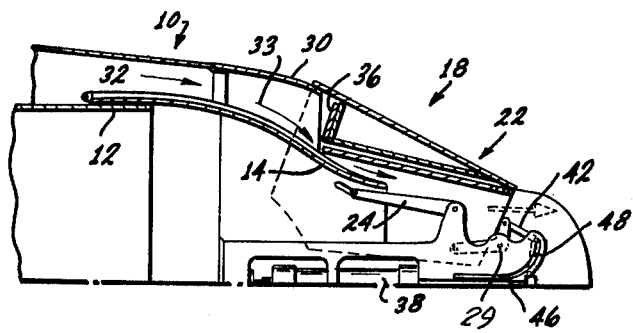
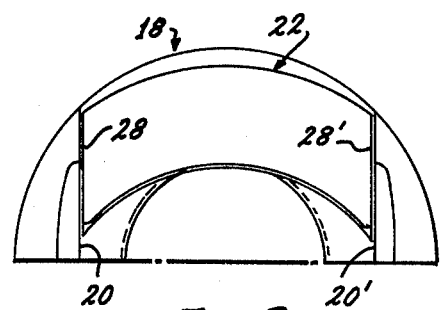
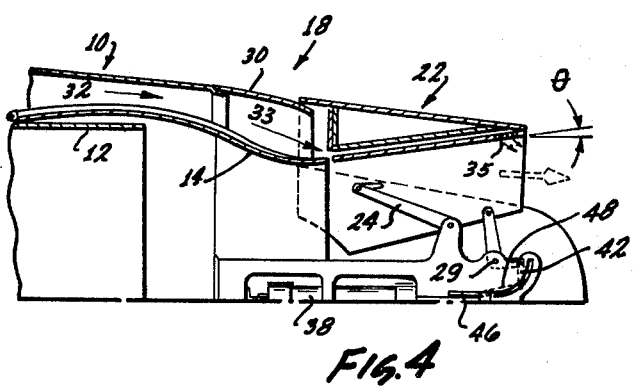
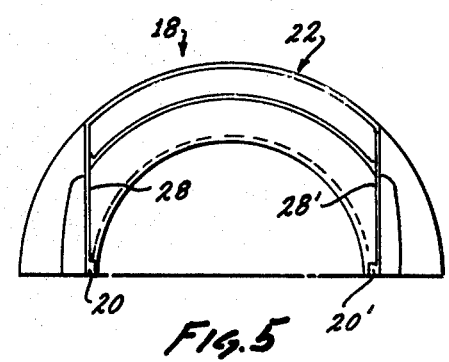
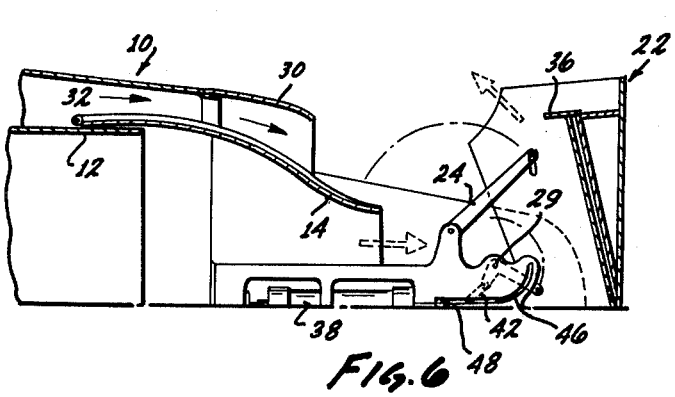
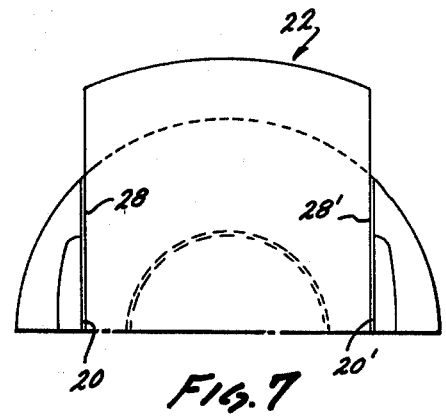

INTEGRATED DIVERGENT EXHAUST NOZZLE THRUST REVERSER

BACKGROUND OF THE INVENTION

This invention lies in the field of gas turbine engines for aircraft which produce reaction thrust by discharging a high velocity stream of gas from the exhaust nozzle of the gas turbine. This invention is directed to apparatus for varying the gas turbine exhaust nozzle exit area of high performance aircraft to optimize thrust for subsonic and supersonic flight regimes and which also incorporates means to effect thrust modulation and thrust reversal in flight or during ground roll. It is directed more particularly to a variable area divergent exhaust nozzle which is integrated with a target-type thrust reverser for use in conjunction with a convergent nozzle, the combination of which are relatively simple in construction and mechanization and are configured to obtain a high degree of forward thrust efficiency.

In the forward thrust mode, the nozzle system may be used for efficient subsonic cruise operation and efficient supersonic acceleration and dash operation. In the reverse thrust mode, the system may be used to produce superior aircraft deceleration capability to enhance Air Combat Maneuvering and to improve air-to-ground weapons delivery. In the modulated thrust mode, the system may be used for precise flight path control for formation flying and aerial refueling and as a high drag device to permit steep approach angles for landings while maintaining precise glide path control and a rapid full-thrust go-around capability. On the ground, the system may be used to produce superior deceleration capability to reduce landing ground roll distance and to modulate and reduce excessive taxi thrust inherent with some designs.

The usual prior art variable area convergent-divergent nozzle systems for use with augmented gas turbine engines achieve area modulation by use of complex multiple petal designs which split the nozzle into many segments of flaps and seals to attain area modulation. The large number of interleafing parts and complex actuating mechanisms contribute to a very expensive nozzle system which cannot be simply integrated with a thrust reversing apparatus.

SUMMARY OF THE INVENTION

The present invention provides a multifunction low drag afterbody, nozzle and thrust reverser system, for use in conjunction with a convergent nozzle, and utilizing a common actuation system to form: first, an efficient nozzle-afterbody for subsonic cruise operation; second, a divergent nozzle-afterbody for efficient supersonic operation; and third, a target-type thrust reverser for in-flight or ground roll deceleration. Significant features of the invention are the simplicity of the configuration and mechanisms, the relatively small number of parts, a low drag external profile, a thrust efficient internal profile, a simple internal cooling concept for reheat augmented thrust operation and a simple, proven two door target-type thrust reverser configuration.

Generally stated, the divergent nozzle-thrust reverser system is adapted for use with one or more jet engines, may be supported by the engine tailpipe or aircraft fuselage and forms a virtual continuation thereof to receive and control the exhaust gas from an engine mounted variable area convergent nozzle. The nozzle-reverser system includes a pair of laterally spaced fixed side walls having parallel planar opposing walls which house the actuation system and mechanism and which support a pair of nozzle-reverser sections located between said parallel walls. The two nozzle-reverser sections are movable toward and away from the engine axis to vary the divergent nozzle exit area and external boat tail for efficient forward thrust operation for various flight regimes. The outer marginal side walls of the movable sections are in sealed slidable engagement with the fixed side walls to limit gas leakage.

The nozzle-reverser sections may be pivoted and rotated outward and aft to meet at the engine axis to form a blocker target which blocks the rearward flow of the exhaust gas stream and diverts it laterally and forward to produce reverse thrust. The nozzle-reverser sections may be pivoted to any position between the forward thrust position and the full-reverse thrust position to produce the desired degree of thrust modulation.

BRIEF DESCRIPTION OF THE DRAWINGS

Various other advantages and features of novelty will become apparent as the description proceeds in conjunction with the accompanying drawings, in which:

FIG. 2, is a cross sectional side elevation view (above the centerline) of the nozzle-reverser system shown in the cruise thrust position.

FIG. 3, is an aft end view (above the centerline) of the nozzle-reverser system shown in the cruise thrust position.

FIG. 4, is a cross sectional side elevation view (above the centerline) of the nozzle-reverser system shown in the augmented thrust position.

FIG. 5, is an aft end view (above the centerline) of the nozzle-reverser system shown in the augmented thrust position.

FIG. 6, is a cross sectional side elevation view (above the centerline) of the nozzle-reverser system shown in the reverse thrust position.

FIG. 7, is an aft end view (above the centerline) of the nozzle-reverser system shown in the reverse thrust position.

Throughout the various FIGS., the same reference numeral depicts the same or identical element or part.

DESCRIPTION OF PREFERRED EMBODIMENTS

Figure 1:
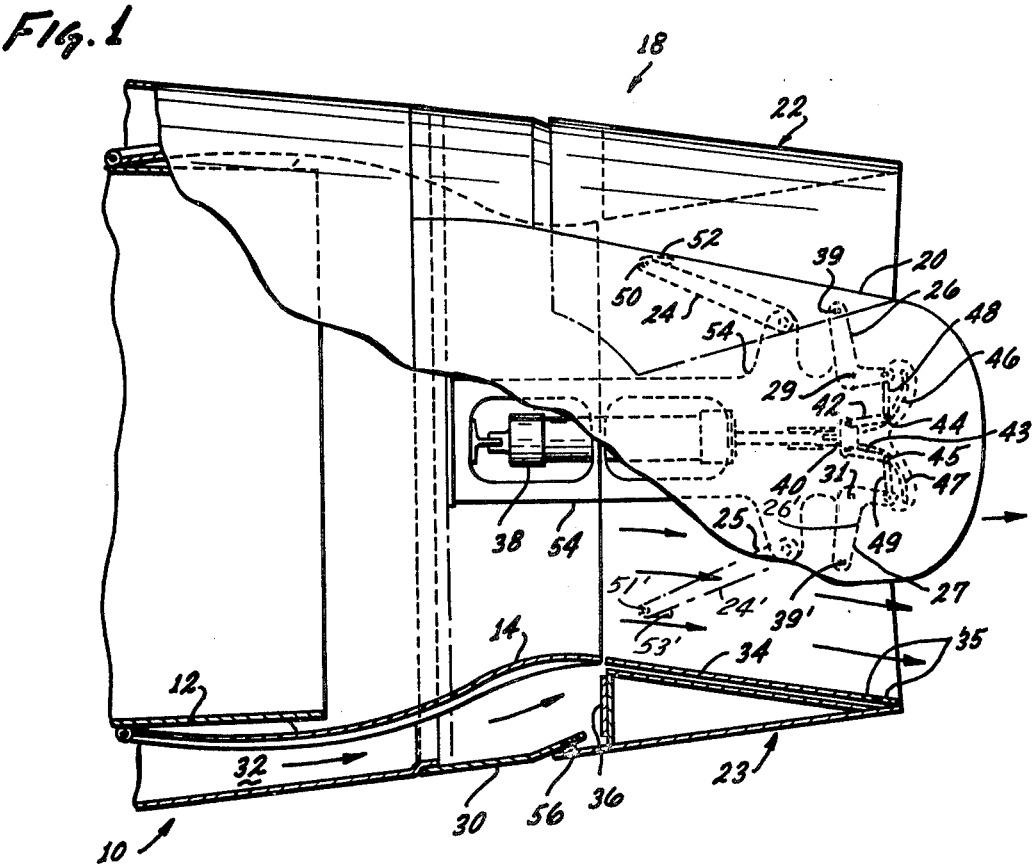
FIG. 1, is a side elevation view of the present invention showing the nozzle-reverser system in the augmented (forward) thrust position, certain parts being broken away and certain parts being shown in section.

The general arrangement illustrated in FIG. 1 shows an embodiment of the invention in its relation to other elements of a typical jet engine installation. The aft portion of an aircraft fuselage 10 or nacelle is shown enclosing the aft portion of a jet engine tailpipe 12 having a translating variable area convergent nozzle 14 from which the propellant gas stream is rearwardly discharged. The tailpipe and nozzle in the example are generally circular in cross section. Various other cross-sections configurations may, however, be utilized to successively practice the invention.

A variable divergent nozzle-thrust reverser 18 is mounted co-axially with the engine aft of the convergent nozzle. The divergent nozzle-thrust reverser is shown here mounted to the aircraft aft fuselage, but may be alternatively mounted to the engine tailpipe. The divergent nozzle-thrust reverser is comprised of a pair of parallel planar side walls 20 and 20', see FIGS. 3, 5 and 7, and a pair of generally similar, complementary nozzle-reverser sections 22 and 23 located between the side walls and pivotally mounted to the side walls by a four-bar linkage 24 and 26 and 24' and 26' opposite side (not shown) being the same. The outer marginal sides 28 and 28' of the nozzle-reverser section 22 are in slideable engagement with, and sealed by a spring seal (not shown) to the side walls 20 and 20' to permit swinging movement of the nozzle sections 22 and 23 toward and away from the engine axis to vary the cross sectional exit area of the flow path therebetween. The side walls 20 and 20' are mounted to the aft fuselage 10, and are stabilized by a fixed hoop structure 30 comprising the forward end of the nozzle and to which is attached a leaf seal 56 adjacent to the nozzle sections.

The cruise position of the nozzle-reverser system is shown in FIGS. 2 and 3. The cross sectional shape of the cruise nozzle exit is generally oblate as shown in FIG. 3. Secondary airflow, depicted by arrows 32, equivalent to a small percentage of the engine airflow is introduced along the exterior of the convergent nozzle 14 to ventilate the excess base area to improve cruise thrust performance. The source of the secondary airflow may be engine fan air, engine bleed air, engine seal leakage, external air or combination thereof, selected to provide optimum overall thrust-minus-drag performance.

The reheat augmented thrust position of the nozzle-reverser system is shown in FIGS. 1, 4 and 5. The cross sectional shape of the augmented nozzle exit of the preferred embodiment is generally circular with truncated sides adjacent to the parallel side walls 20 and 20°. The divergence angle $\theta$ may be varied by moving the nozzle-reverser sections 22 and 23 independently about a forward pivot point of cam roller 50 and 51' (see FIG. 1) and in coordination with the maximum and new maximum area positions of convergent nozzle 14 for optimum reheat thrust performance. The secondary airflow 32 is caused to pass along arrow 33 between a double wall passage 34 in the nozzle-reverser sections 22 and 23 and between a similar passage in the side walls 20 and 20', during reheat operation to cool the structure and mechanisms. The secondary air along arrow 33 either exits through openings 35 (see FIG. 4) or out opening 37 (see FIG. 8).

The reverse thrust position of the nozzle-reverser system is shown in FIGS. 6 and 7. The nozzle-reverser sections 22 and 23 are rotated outward and aft by action of the four-bar linkages 24 and 26 and 24' and 26' opposites (not shown) to meet at the engine axis to form a blocker target which blocks the rearward flow of the exhaust gas stream and diverts the gas laterally and forward to produce reverse thrust. The nozzle-reverser sections 22 and 23 may be positioned at any point along its path of travel between the reheat forward thrust position FIG. 4 and the full-reverse thrust position shown in FIG. 6 to produce the desired degree of modulated thrust by blocking and re-directing a portion of the exhaust gas flow.

Figure 8:
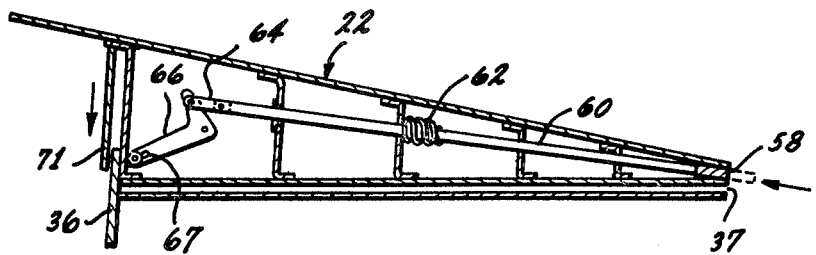
FIG. 8 is a partial cross-section of the nozzle reverser in detail showing an end plate and its operating mechanism.

A movable end-plate 36, see FIG. 8, is caused to slide outward by the action of the two nozzle-reverser sections 22 and 23 coming together at the engine axis against an extended slug 58 which is caused to move the assembly against a push rod 60 and connecting like 64 which causes a bell crank to move the end plate 36.

When the nozzle-reverser sections move away from the engine axis toward the stowed position, a spring 62 (shown compressed) causes the push rod 60 to extend the slug 58 and retract the end plate 36. Other mechanical schemes may be used to actuate the end plate. The height and shape of the end-plate 36 may be tailored to provide the desired degree of reverse thrust effectiveness and shaping of the end-plate may be used to influence the exhaust gas direction to avoid aircraft control surfaces or other appurtenances.

Another feature of the invention is the provision of a common mechanism for achieving the reverse thrust position. The mechanism, see FIG. 1, consists of a two way linear actuator 38 (hydraulic, pneumatic or the like) for driving a guided slider fitting 40 which in turn drives connecting links 42 and 43 which are attached to cam rollers 44 and 45 which move along cam tracks 46 and 47 driving a second connecting link 48 and 49 which cause the bell cranks 26 and 27 to rotate about pivot points 29, 32, respectively, and move the nozzle-reverser sections 22 and 23 in conjunction with the idler links 24 and 25. The idler links 24 and 25 are connected to the nozzle-reverser sections 22 and 23 through like cam rollers 50 and 51' which move along like cam tracks 52 and 53' located in the nozzle-reverser sections. The action of the bell crank 26, 27 causes the cam roller 50, 51' to move to the aft end of the like cam track 52, 53' when the nozzle sections are commanded to the cruise position FIG. 2 (upper portions shown only). When the bell crank 26 causes the nozzle-reverser section 22 to move to the reheat nozzle position FIG. 4, the cam roller 50 is driven by the idler link 24 to the forward end of the cam track 52 where it engages a spring-loaded lock mehanism (not shown) which restrains the roller in this position for travel during varying degrees of partial reverse thrust to the full reverse thrust position of FIG. 6. The lock mechanism will automatically release the cam roller 50 when the nozzle-reverser section 22 returns to the reheat position FIG. 4 and begins its travel to the cruise position FIG. 2 as caused by forces generated by the bell crank 26. The entire mechanism is mounted to a support structure 54 which is attached to the aircraft aft fuselage, nacelle or engine tailpipe at its forward end and stabilized by a fixed hoop structure 30 which forms the forward portion of the nozzle-reverser assembly. The flexible leaf seal 56 is attached to the aft end of the hoop structure 30 to cause a seal between the nozzle-reverser sections 22 and 23 and the fixed structure. It will be apparent that the invention disclosed herein utilized a relatively small number of simple and reliable components, when compared with the prior art, to provide a multiple function apparatus for achieving highly efficient forward thrust operation with the capability for modulated and reverse thrust operation.

Having thus described the invention, what is claimed as new and useful and is described to be secured by U.S. Letters Patent is:

1. An integrated low drag afterbody, divergent nozzle and thrust reverser system for use on high performance aircraft with subsonic cruise and supersonic flight capabilities having at least one jet engine with a rearwardly discharging nozzle adapted to produce reaction thrust comprising:

a variable divergent nozzle and a low drag afterbody for connection to the aircraft for receiving and controlling rearward flow of the exhaust gas stream from said variable convergent nozzle;

said system comprising at least two fixedly mounted laterally spaced sidewalls having parallel planar opposing faces;

at least two nozzle-reverser sections positioned between said sidewalls with forward and aft pivotal connections thereto and having inner walls forming continuations of said convergent nozzle for further controlling said rearward flow of said exhaust gas stream, said nozzle-reverser sections have outer marginal sides in slideable sealing engagement with said opposing faces of said sidewalls, and move in a first direction about said forward pivotal connection toward and away from the engine longitudinal axis to vary the cross-sectional area of the divergent nozzle exit through a plurality of intermediate positions from a minimum area cruise position to a maximum divergent reheat augmented thrust position to effect the proper coordination and match with the position of the variable convergent nozzle for substantially optimum expansion of said exhaust gas streams while maintaining a low drag external afterbody and move in a second direction about said aft pivotal connection outward and aft until their rearmost surfaces meet at the engine longitudinal axis to form a thrust reverser for redirecting said exhaust gas laterally and forward to effect reverse thrust; and actuation means for moving said nozzle-reverser sections.

2. The invention as defined in claim 1, wherein said fixed sidewalls comprise inner and outer walls with a passage therebetween for the flow of secondary air from a source around said engine for ventilating the excess base area during cruise conditions.

3. The invention as defined in claim 1, wherein during said second direction said nozzle-reverser sections are positionable to any position intermediate of their travel between forward and reverse thrust positions to modulate thrust and drag.

4. The invention as defined in claim 1, wherein a bypass duct is provided for the flow of secondary air from a source around said engine and passages are provided for the flow of said secondary air along the surface of said inner walls remote from said exhaust gas stream during the reheat augmented thrust operation for cooling said inner walls, said flow of secondary air being encouraged by positive pressures at the upstream end and lower pressure at the downstream end where exits exist.

5. The invention as defined in claim 1, wherein a movable end plate positioned at the edge of said nozzle-reverser sections opposite from the engine longitudinal axis, said endplate is normally biased in an inactive position except at full thrust reversing positions of said nozzle sections wherein they are mechanically operated to a deployed position.

6. The invention as defined in claim 1, wherein said actuation means comprises a common mechanism for selectively pivoting said sections about said forward and aft pivotal connection.

7. A low drag afterbody providing an integrated divergent nozzle and thrust reverser for an aircraft employing a jet engine, said aircraft includes a nacelle enclosing said engine in a spaced relationship therefrom to form a bypass duct for the flow of secondary air, said engine including an exhaust nozzle and a variable convergent nozzle longitudinally translatable between a maximum convergent and a minimum convergent position, comprising at least two opposing nozzle-reverser sections mounted to said aircraft to further control the gases exiting said convergent nozzle and continue the outer aerodynamic profile of said cowling during normal aircraft flight, said nozzle-reverser sections being pivotable about a forward pivot connection in a first direction from a position where they are least effective in controlling said thrust producing gases through a range of degrees of divergent positions where they control the expansion of the thrust producing gases and pivotable about an aft pivot connection in a second direction wherein said thrust producing gases are progressively blocked until full blockage and redirection of the thrust producing gases is achieved, and actuation means is provided for rotating said nozzle-reverser sections in said first and second directions.

8. The invention as defined in claim 7, wherein said variable divergent nozzle is attached to said engine.

9. The invention as defined in claim 7, wherein said rearward pivot point moves along a predetermined path or said nozzle-reverser sections pivot thereabout.

10. The invention as defined in claim 7, wherein said nozzle-reverser sections are provided with thrust directing end plates, said end plates are biased in a normally inactive retracted position and are deployed to an active extended position when said nozzle-reverser sections are in their maximum thrust reversing position.

11. The invention as defined in claim 7, wherein said nozzle-reverser sections are provided with passages within their inner most walls which are exposed to said thrust producing gases, said secondary air flows therethrough for cooling during augmented thrust conditions.

12. The invention as defined in claim 7, wherein passages are provided for the flow of said secondary air through said nozzle-reverser sections during cruise conditions.

13. The invention as defined in claim 7, wherein said actuation means comprises a common mechanism for selectively pivoting said sections about said forward and aft pivot connections.

14. An integrated low drag afterbody, divergent nozzle and thrust reverser system for use on high performance aircraft with subsonic cruise and supersonic flight capabilities having at least one jet engine with a rearwardly discharging nozzle adapted to produce reaction thrust comprising:

a variable divergent nozzle and a low drag afterbody for connection to the aircraft for receiving and controlling rearward flow of the exhaust gas stream from said variable area convergent nozzle;

said system comprising at least two fixedly mounted laterally spaced sidewalls having parallel planar opposing faces;

at least two nozzle-reverser sections positioned between said sidewalls and having inner walls forming continuations of said convergent nozzle for further controlling said rearward flow of said exhaust gas stream, said nozzle-reverser sections have outer marginal sides in slideable sealing engagement with said opposing faces of said sidewalls, and move in a first direction toward and away from the engine longitudinal axis to vary the cross-sectional area of the divergent nozzle exit through a plurality of intermediate positions from a minimum area cruise position to a maximum divergent reheat augmented thrust position to effect the proper coordination and match with the position of the variable convergent nozzle for substantially optimum expansion of said exhaust gas streams while maintaining a low drag external afterbody and in a second direction outward and aft until their rearmost surfaces meet at the engine longitudinal axis to form a thrust reverser for redirecting said exhaust gas laterally and forward to effect reverse thrust;

actuation means for moving said nozzle-reverser sections; and a movable end plate positioned at the edge of said nozzle-reverser sections opposite from the engine longitudinal axis, said end plate being normally biased in an inactive position except at full thrust reversing positions of said nozzle sections wherein they are operated to a deployed position.

15. A low drag afterbody providing an integrated divergent nozzle and thrust reverser for an aircraft employing a jet engine, said aircraft includes a nacelle enclosing said engine in a spaced relationship therefrom to form a bypass duct for the flow of secondary air, said engine including an exhaust nozzle and a variable convergent nozzle longitudinally translatable between a maximum convergent and a minimum convergent position, comprising at least two opposing nozzle-reverser sections mounted to said aircraft to further control the gases exiting said convergent nozzle and continue the outer aerodynamic profile of said nacelle during normal aircraft flight, said nozzle-reverser sections being pivotable in a first direction from a position where they are least effective in controlling said thrust producing gases through a range of degrees of divergent positions where they control the expansion of the thrust producing gases and in a second direction wherein said thrust producing gases are progressively blocked until full blockage and redirection of the thrust producing gases is achieved, actuation means for rotating said nozzle-reverser sections in said first and second directions and a movable end plate positioned adjacent the forward edge of said nozzle-reverser sections said end plate being normally biased in an inactive position except at full thrust reversing positions of said nozzle sections wherein they are operated to a deployed position.

* * * * *